(12) United States Patent
Hagens

(10) Patent No.: US 6,562,118 B2
(45) Date of Patent: May 13, 2003

(54) ASPHALTIC COMPOSITIONS CONTAINING FIBROUS MATERIALS WITH IMPROVED RESISTANCE TO TEMPERATURE DEGRADATION

(75) Inventor: Graham Hagens, Hamilton (CA)

(73) Assignee: Lafarge Materials & Construction Inc., Ontario (CA)

( * ) Notice: Subject to any disclaimer, the term of this patent is extended or adjusted under 35 U.S.C. 154(b) by 294 days.

(21) Appl. No.: 09/799,108

(22) Filed: Mar. 6, 2001

(65) Prior Publication Data

US 2001/0047738 A1 Dec. 6, 2001

Related U.S. Application Data

(60) Provisional application No. 60/187,063, filed on Mar. 6, 2000.

(51) Int. Cl.$^7$ ........................ C09D 195/00; C08L 95/00
(52) U.S. Cl. ..................................... 106/164.6; 106/282
(58) Field of Search ................................ 106/282, 164.6

(56) References Cited

U.S. PATENT DOCUMENTS

| | | |
|---|---|---|
| 4,032,355 A * | 6/1977 | McLaughlin et al. .... 106/284.4 |
| 4,302,370 A | 11/1981 | Buse |
| 4,422,878 A | 12/1983 | Fry |
| 4,738,723 A | 4/1988 | Frizzell et al. |
| 4,820,078 A | 4/1989 | Brocious |
| 5,028,266 A | 7/1991 | Rettenmaier |
| 5,407,139 A | 4/1995 | Mleczewski |
| 5,468,546 A | 11/1995 | Loftus et al. |
| 5,529,247 A | 6/1996 | Mleczewski |

* cited by examiner

Primary Examiner—David Brunsman
(74) Attorney, Agent, or Firm—Dinesh Agarwal, P.C.

(57) ABSTRACT

A method is described for the modification of asphaltic compositions such that cellulosic fibers are not degraded by the asphalt at elevated temperatures. This is achieved by the addition of addition of certain inorganic or organic alkaline materials to the composition. As a further embodiment of the invention, a method is also described for the dispersion of cellulosic fibers in liquid asphalt in such a way as to obtain a thermally stable product with defined viscoelastic properties. This comprises blending the fibers with asphalt, fibers and alkaline additives under controlled mixing conditions such that the required viscometric specification is attained.

9 Claims, No Drawings

ASPHALTIC COMPOSITIONS CONTAINING FIBROUS MATERIALS WITH IMPROVED RESISTANCE TO TEMPERATURE DEGRADATION

This application is a replacement application of U.S. provisional application Serial. No. 60/187,063 filed on Mar. 6, 2000 which, in its entirety, is incorporated herein by reference.

BACKGROUND OF THE INVENTION

Asphaltic products are produced in various forms, with the primary application being in paving and construction products. Some asphalt products have improved properties as a result of chemical processing, or the inclusion of various additives. One of the more important class of materials included in asphaltic compositions are fibers of various types, which are known to improve the tensile strength and integrity of the final product. Asphalt-fiber combinations play an important role in the manufacture of various products useful for construction including water resistant building papers, felts and roofing materials such as shingles. An extensive field of use for fiber modified asphalt (FMA) in road paving applications is also known, such fibrated products having improved strength and wear resistance compared to other road pavements. It has been reported that flex and durability have been substantially improved with respect to paving and sealing compositions by including reinforcing fiber materials. An important aspect of FMA is the fact that fibers increase the viscosity of the asphalt thus providing a product which can be retained on vertical surfaces at elevated temperatures.

One of the serious weaknesses of fibrated asphaltic materials used for construction is that the fibers degrade over time. This occurs as a result of various chemical reactions which occur as a result of the exposure of the fibers to heat and light. The problem is particularly acute when catalytically hardened, or oxidized asphalt is used in that it has been found that the chemicals present are particularly damaging to cellulosic fibers. As a consequence cellulosic fibers are often replaced by more stable, but more expensive, synthetic fibers in areas where high ambient temperatures demand the use of harder asphalt;

One of the most promising commercial applications for FMA stems from the popularity of new types of road paving which require high viscosity fibrated asphalt widespread use of fibrated asphalt in road construction has, however, been hindered by the practical difficulties of incorporating the fibers into the composition. All known paving applications of FMA thus involve incorporation of the fibers at the construction plant where the composition is prepared immediately prior to compaction on the roadbed. Although there are numerous disadvantages to this approach, no method of simplifying the process by premixing the asphalt and fiber has yet been described. Such a process would require both a method of manufacturing an FMA premix with defined performance specifications, and also of stabilizing the dispersion so that its properties would be retained in transit and during storage at the job site. These activities frequently take as many as 10 days, during which time the FMA is held at temperatures up to 160° C.

The present invention is principally directed to a method for chemically modifying asphalt to protect cellulose fibers from degradation at high temperatures. A particular embodiment of this invention relates to the manufacture of roofing materials such as shingles and another particular embodiment to the manufacture of FMAs of superior properties and stability, particularly for the construction of roads.

BRIEF REVIEW OF THE PRIOR ART

Fibrated Liquid Asphalt Compositions

Many asphaltic compositions employing organic and inorganic fibers are known. Inorganic fibers include fiberglass, mineral wool asbestos etc., while organic fibrous compositions include synthetic rubbers and polymers of various types, as well as natural cellulosic fibers. Numerous examples of the benefits of incorporating fibers in both aqueous and non-aqueous asphalt compositions have been described. Thus U.S. patents issued to Frizzell U.S. Pat. No. 4,738,723, Borger U.S. Pat. No. 5,897,950, German Patent 39 30 59 and French Patent 26 76 436-A1 disclose ways of improving hot melt asphaltic compositions using inorganic or organic fibers. References to the incorporation of fibers into asphaltic emulsions include the U.S. Patents of Draper U.S. Pat. No. 3,474,625, Bresson U.S. Pat. No. 3,993,496, Buse U.S. Pat. No. 4,302,370, Duszak U.S. Pat. No. 4,492,781 and Marvel et. al. U.S. Pat. No. 4,663,370.

In spite of these numerous examples of admixing fibers and asphalt, no reference is to be found to the preparation of stable FMA premixes. Unlike asphalt emulsions which are usually produced far from the point of sale, hot melt FMA is always prepared at the point of use (E. R. Brown et. al., "Designing Stone Matrix Asphalt Mixtures", National Center of Asphalt Technology Publication, July 1998 and L. A. Cooley and E. R. Brown, "Evaluation of Asphalt Binders Containing Fibers and Fillers." Transportation Research Board Meeting, Washington D.C. January 1999). In this process, bags of fiber are usually added manually to the mixer, while on other occasions expensive specialized feeding equipment is employed. Both methods are less than satisfactory in that they require a significant investment of time and energy or equipment to achieve a satisfactory blend of the various ingredients. Manual addition is slow and subject to variability, and the poor workability of the resulting composition often results in an unacceptable increase in processing temperature. Addition of fiber at the work site thus adds significantly to the cost of paving construction due to the special attention required, and many of the disclosures are directed to improving this application.

In an attempt to improve the efficiency of this operation Mleczewski (U.S. Pat. Nos. 5,407,139 and 5,529,247) disclosed a method by which fibers are discharged into a chamber containing hot asphalt and aggregate. The bulky equipment described is, however, unsuitable for most operations similarly the method invented by Brocious (U.S. Pat. No. 4,820,078) for dispensing a mixture of asphalt and fiber would significantly add to the cost of the process, as would that of Strassman (U.S. Pat. No. 5,460,649). Rettenmaier (U.S. Pat. No. 5,028,266) has described another complex process which requires the fibers to be first encapsulated into pellets, and then packaged and shipped to the job site where they are introduced by means of a calibrated conveyor. Fry (U.S. Pat. No. 4,422,878) attempted to solve some of the process problems encountered by admixing polypropylene fibers with fatty acids, but this is not applicable to cellulosic fibers which are destroyed by acids at elevated temperatures.

Although other attempted solutions have also been disclosed in U.S. Patents (e.g. Roberts, U.S. Pat. No. 4,316,829; Marzocchi U.S. Pat. No. 4,166,752; Loftus et. al. U.S. Pat. No. 5,468,546; Gallagher et. al. U.S. Pat. Nos. 5,718,787, 5,869,413, 5,897,951) none of these considered the possibility of preparing a stable premix of fibers in asphalt.

Asphaltic compositions, as for use in paving, are frequently stored for several days at temperatures of up to 160°–170° C. Hitherto, the difficulty of preparing an asphalt dispersion of fibers of acceptable stability under these conditions has seemed unsurmountable. To some extent at least, this is attributable to a general poor understanding of the relationship which exists between processing conditions and the properties of FMAs.

Asphalt Treated Fibrous Mats

Good thermal stability of cellulosic fibers in contact with hot asphalt is also important in a very different industrial application, that of construction papers such as roofing shingles. In this case the actual temperature of exposure is lower, but the duration is considerably longer in that the strength of the fibrous mat after years of exposure to beat and sunlight is a major concern. In shingle production the problems associated with loss of fibers strength differ from those encountered in road construction where the short term fiber integrity is more important. It is therefore of some significance that we have discovered that the decomposition of cellulosic fibers in roofing shingles and hot melt road compositions appears to be due to the same chemical reaction, and thus both subject to the solution which the present invention affords.

Shingle manufacturing consists of running a continuous wet process fiber mat into a bath of molten asphalt or bituminous materials as a result of which the asphalt saturates the mat by filling the interstices between the fibers.

The art is well known end described in various U.S. Patents e.g. Kennepohl et. al. U.S. Pat. No. 4,079,158, Hansen U.S. Pat. No. 4,405,680, Mikols U.S. Pat. No. 4,490,493, Pike U.S. Pat. No. 5,565,239 and Chang U.S. Pat. No. 4,382,989. In general the fibers may be either inorganic (e.g. glass) or organic (e.g. cellulosic) in composition, and two different grades of asphalt are typically used in the manufacture of such roofing material. The first is a saturant grade asphalt which provides the shingle with its main tensile strength by reinforcing the felt backing, while the second is a coating grade which is often extended with inert mineral filler to make a coating which gives the roofing material its durability.

The asphalt may also contain up to 65% by weight of various fillers such as ground limestone, carbon black, recycled rubber, clay etc. After hot asphalt is spread onto the roofing felt, roofing granules are impregnated into the saturated matte, the granules providing the final color of the shingle.

Over the years it has been found that those types of asphalt which have the preferred properties for shingle manufacture, namely the ability to soften gradually when subject to high ambient temperatures, are also the most aggressive to the cellulosic fibers. For example, one preferred grade of asphalt, a 64/-28 performance grade asphalt manufactured by Petro Canada, contains certain proprietary acidic additives which accelerate the rate of attack of cellulosic fibers to the extent that this grade of asphalt cannot be used in the main body of shingle. Shingle manufacture therefore often involves a two-stage process in which the fibrous mat is first impregnated with less favorable softer asphalt in order to minimize the rate of decomposition of the fibers. The preferred harder asphalt is then applied as a second coat. Thus two apparently different industrial processes, road construction and shingle manufacture, are both negatively affected by the fact that cellulosic fibers are degraded by exposure to hot asphalt for extended periods of time.

SUMMARY OF THE INVENTION

It is a principal object of this invention to provide a chemically modified asphalt which does not degrade cellulosic fibers when exposed to heat for extended periods of time.

It is a further object of the present invention to provide a method of manufacturing asphalt treated cellulosic fibre mats such as tat papers and shingles having improved stability in use against degradation by elevated temperatures and sunlight.

It is a further object of the invention to provide a method of preparing liquid fibre-modified asphalt compositions to attain predetermined rheological specifications.

With a view to attaining these objects and overcoming the difficulties and shortcomings of prior known asphaltic products and methods for making them, the present invention provides, according to one aspect thereof, a fibre-modified asphalt composition which includes cellulosic fibers and sufficient alkaline material to impart enhanced resistance of the fibers to chemical degradation on exposure to heat for extended periods of time.

It is also an aspect of the invention to provide a method for preparing fibre-modified asphalt compositions and pre-mixes by monitoring the viscosity of the asphalt and fibers mixtures during dispersion mixing at a sufficiently high shear to homogenize the dispersion and comparing the measured viscosity against a previously-prepared viscosity-time curve for a mixture of the same composition. The surprising reproduceability of the plotted results allows the process to be stopped at a stage corresponding to desired rheological specifications of the mixture.

DETAILED DESCRIPTION OF THE INVENTION

For the purpose of the present invention, the term "asphalt" refers to the material used as a base component for paving or sealing purposes or for the manufacture of construction materials It includes various bituminous substances such as natural or petroleum-refiner asphalts, asphaltites, pyrogenous distillates, bottom stock as well as other pyrogenous residues such as petroleum pitch, coal tar pitch and mixtures thereof. The asphalt may also contain small amounts of oils such as process oils, lubricants etc., aging accelerators, metallic catalysts or stabilizers such as antioxidants. It may further contain long chain fatty acids such as have been previously disclosed.

The asphalt is conveniently characterized by a penetration value from 0 to 300 or higher, and preferably about 40–300 (ASTM D-5-51) with a softening point in the range of about 30 to 120° C. and preferably between 38 and 115° C. (ASTM D-36-26).

The below-described embodiments of my invention are based on my discovery that incorporation of one of more of the alkaline materials mentioned above into asphalt at relatively low concentration results in a dramatic improvement of the stability of any cellulosic fibers which are in contact with the asphalt for extended periods of time. This applies both to the asphalt impregnated fibrous mats employed in shingle manufacture, and to the dispersions of cellulosic fibers in asphalt known as FMA.

A wide range of alkalis are suitable for this application. Thus alkali metal and alkaline earth hydroxides or carbonates or silicates and any of the basic salts which form as a result of the reaction of Group I, II or III metals with a weak acid may be included. In practical terms, however, the application will normally be limited to those alkaline materials which are inexpensive and non-toxic, among which the hydroxides, carbonates, bicarbonates and soluble silicates of sodium, calcium and magnesium are to be preferred.

A wide range of organic bases are similarly effective in this regard, although for practical purposes it would be preferable to consider only those organic bases which have low toxicity and volatility, are thermodynamically stable under the conditions required and are relatively inexpensive. Products which fall into this category include the various primary, secondary and tertiary alkyl and aryl amines, alkanolamines, (e.g. triethanolamine), polymers (e.g. polyethylenimines), and combinations such as alkyl aryl amido-amines and polyamines known to the art. Included within this class would be the various aryl- and alkylamines and amidoamines, including their alkoxylated versions, which have been disclosed for use as, or "anti-stripping agents." Thus all such materials which rely on the basic nature of an amino function to improve the adhesion between asphaltic and aggregates in road construction are included. Although only one class of amine has been tested here, it is to be expected that any of those referred to above would be capable of neutralizing the acids present in the asphalt cement, and thus protect the cellulosic fibers.

1. Asphalt-treated Fibrous Mats

The first embodiment of my invention is the manufacture of construction materials such as tarpaper and shingles in such a way that the fibers are stabilized against long term exposure to heat and light. As is well known to those familiar with such materials, cellulosic fibers which are in intimate contact with asphalt gradually break down over time when the material is subject to light and heat. Although the mechanism of this destruction is not fully understood, it has been noticed that the rate of decay is particularly rapid when the asphalt contains certain oxidative catalysts which are often used commercially to raise the softening temperature of the asphalt. The consequence of this phenomenon is that the desirable high melting asphalt cements may not be used in combination with cellulosic fibers for construction applications where the end product is subject to high ambient temperatures. This has required either that a more expensive manufacturing process, or more expensive non-cellulosic fibers be used for such applications.

In the course of investigating fiber modified asphalt cements we discovered that the destruction of cellulosic fibers which is so problematic to the manufacture of roofing shingles and roads, could be prevented by the incorporation of one or more alkaline ingredients into the FMA. Although the precise mechanism is still poorly understood, and without limiting the claims of this invention, it would appear that the destruction of the cellulosic fibers may be the result of acidic catalyzed hydrolysis of the carbohydrates which make up cellulose (acidolysis), rather than oxidative degradation as others had suggested.

Cellulose is well known to be sensitive to various types of acids. In the production of paper from wood pulp, for example, paper produced under alkaline conditions has much better longevity than that produced at an acidic pH as practiced in years past. Asphalt cement (AC) is in fact acidic in nature, with an "acid number" routinely used to characterize particular grades of asphalt. Such acidity may also be enhanced by the addition of certain acids, such as that from tall oil, which is often added to asphalt to modify its properties. Moreover many of the oxidative catalysts used to increase the hardness of asphalt include metallic salts which are acidic in nature.

As the examples below will illustrate, it was found that the stability of FMA depends on the properties of the asphalt cement itself. Thus Performance Grade (PG) asphalt 64/-28 from Petro Canada which contains proprietary oxidative catalysts, was found to degrade cellulosic fibers much more quickly than did PC 58/-28 which contains no such additives. As the examples show, although the presence of alkalis was able to retard the degradation of the fibers in both cases, a higher level of alkali was required in the former, more aggressive composition.

2(a) Cellulose Fibre Modified Asphalt Compositions

A second embodiment of this invention is related to the chemical stability of FMA dispersions. As mentioned above, in the course of manufacturing various asphaltic products it is frequently necessary to store the asphalt at temperatures up to 165° C. for several days at a time. As will be illustrated in the examples below, FMA containing cellulosic fibers does not normally retain its desired properties under such storage conditions. The decline is noted in a decrease in viscosity, and when the fibers are recovered they are found to have disintegrated into small fractions, or a dark powder.

According to my invention, FMAs are protected from chemical degradation at elevated temperatures. Such stabilization is achieved by incorporation of one or more of the above-described alkaline materials within the composition. Overall, this invention discloses methods and compositions which reduce the cost of asphalt based construction materials by simplifying the incorporation of fiber at the construction site.

Included in this invention are the various rubberized asphalt compositions known to those skilled in the art, which are prepared by admixing the asphalt with various natural and synthetic rubbers including, but not limited to, the various polymers and co-polymners of styrene, isoprene butadiene, chloroprene etc. Also included are the various non-fibrous polymers frequently incorporated into asphaltic compositions such as the polymers of ethylene, propylene, ethyl acrylate, vinyl acetate and their various co-polymers.

In principle, the invention herein described can apply to the wide range of fibers which have in the past been used to improve the properties of asphalt. These include natural and synthetic inorganic fibers such as asbestos, fiberglass, and mineral wool; the extensive family of synthetic organic such as the polyolefines, polyacrylates etc., and their various co-polymers, as well as natural organic polymers such as cellulose. This invention is however primarily directed to the manufacture of asphaltic products using cellulosic fibers, these being generally preferred because of their ready availability from various sources at relatively low cost. Being non-abrasive they are generally safe to use with various types of process equipment, and having a similar density to that of asphalt are relatively easy to stabilize.

The cellulose fibers of choice generally range from 0.1 to 10 mm in length, with the range of 0.5 to 2 mm generally being preferred, with a thickness of between 0.01 and 0.1 mm, with 0.03 to 0.06 mm being preferred. They may be either virgin or recycled extracted from a wide range of plant species such as cotton, straw, flax or wood etc. The fibers employed may also contain various additional material, such as lignin, clays, dyes, inks, or one or more of the numerous surface modifying agents commonly used in the art of papermaking.

The present method is suitable for all common grades of minerals and coating compounds commonly used in the manufacture of asphalt based construction. These include but are not limited to crushed rock, stone gravel, sand, fine aggregate, mineral dust and fillers, any size distribution of aggregate required to give the final asphaltic product its desired characteristics being within the scope of this invention. Also included are the various finishing compounds such as organic or inorganic adhesives and dyes etc. well known in the art of manufacturing of roofing shingles.

2(b) Control of Manufacturing Process to Optimize Ultimate Rheological and Performance Specifications of FMA Product It is well known that the viscosity of any fibrated liquid composition is a function both of the viscosity of the bulk liquid and the properties of the fibers dispersed within the liquid. The fiber properties consist of various aspects such as percentage loading, dispersion, average length, degree of branching etc. During the process of investigating the manufacture of fibrated asphalt compositions, we discovered to our surprise that the viscosity of the dispersion varies in an unexpected, but reproducible manner during processing. When fiber is added to the asphalt, under conditions of rapid mixing, the viscosity of the composition first rises and then declines at a predictable rate. It is essential for this purpose that sufficient mixing energy be employed both to thoroughly disperse the fibers into the asphalt, and to actually shear, or break down the fibers.

In the process herein described, it may be desirable to "fluff" the fibers using one of the known methods available for this purpose before the adding them to the asphalt. Thereafter they may be conveyed either pneumatically or mechanically into the asphalt which at this stage is heated to between 100 and 160° C. Optionally the asphalt may be contained in a stationary holding tank fitted with a stirrer, in which case the fibers would be introduced to the vortex of the stirrer. Alternately the asphalt may be pumped over a lip or weir in order to increase its surface area, or the tank may be rotated, or the fibers combined with the asphalt using some kind of static mixer, these all being known methods of admixing solid and liquid materials. The quantity of fiber added may range from less than 1 to about 10 percent by weight, the preferred range being between about 3 and 6 percent.

Once the fibers have been introduced the fibrated asphalt is passed through a device which further disperses and shears the fibers. Optionally this device may begin processing the fibers while addition is still continuing. We have found that such conditions overcome the repulsive forces between the hydrophilic cellulosic fibers and hydrophobic asphalt, thus resulting in homogeneous dispersions. The precise type of dispersing mixer employed is not important provided enough energy is present to disperse and shear the fibers. Various types of suitable homogenizers equipment are commercially available for this purpose, the most common being rotor-stator blenders such as Ross™ mixers, colloid mills and the like, all of which have the general principal of generating a steep velocity gradient within the dispersion.

I have found that, following the introduction of the fibers the viscosity of the FMA follows a complex and unexpected response curve. Shortly after addition of the fibers is complete, the viscosity of the dispersion rapidly increases. Then after a period of time, which is a function of the components in the mixture, the viscosity peaks, and then declines.

Although the maximum viscosity attained and rate of subsequent decline in viscosity are functions of the type and relative concentrations of asphalt and fibers used, it turns out that with any one combination of ingredients and using the same equipment, the shape of the curve turns out to be reproducible, and thus predictable.

The surprising and useful result is that knowledge of the shape of the viscosity curve characterizing particular FMA system allows one to prepare the product reproducibly and consistently within the range of predetermined property specifications. This is valuable because it is not always desirable for FMA to have the maximum viscosity achievable. For example it may from time to time be desirable to admix a certain loading of fibers into asphalt, which if incorporated under conditions of optimal viscosity would result in a product so thick as to make processing with conventional pumping equipment impossible.

My discovery therefore affords a method of manufacturing FMA with particular fiber loadings to meet defined rheological specifications.

It is anticipated that different methods of automating the production process could improve the manufacturing process described. Thus it is recognized that the method could be modified to be either a batch or continuous process, in which latter case, a stream of processed FMA might be continually removed at the output end, while fresh asphalt and fiber are combined at the input side. As an additional improvement, in-line measurement of the viscosity could be connected to a process controller in order to adjust the mixing conditions "on the fly" in such a way as to meet the required specifications.

In its preferred embodiment the manufacturing process of my invention involves the physical stability of cellulosic fibers dispersed in asphalt. It is well known that unlike wood, which floats in aqueous systems due to the presence of entrapped air, cellulosic fibers sink rapidly if immersed in liquids of similar density. Thus it is not surprising that cellulosic fibers dispersed in asphalt tend to settle during storage. During the course of this investigation it was discovered that the way in which cellulosic fibers separate from asphalt during storage provides a method of optimizing the physical stability of FMA dispersions.

According to Stokes' Law, the rate of settling (or rising) of a sphere in a liquid is proportional to the square of the radius of the sphere. Although the rate of settling of non-spherical fibrous materials is not described by such a simple formula, we were surprised to discover that the opposite appears to be true in the case of FMA prepared from cellulosic fibers. Those fibers which had been processed the least, were found to form the most stable suspension, while those which had been sheared the most settled fastest. Thus the larger fibers settled more slowly than those which were smaller. This phenomenon is probably related to some type of entanglement between the fibers which modifies the bulk composition, thus effectively raising the viscosity of the surrounding asphaltic medium.

To compound the complexity, it was observed that the fibers first float to the surface, probably as a result of entrapped air, after which they begin to settle. The rate of settling depends therefore on a combination of the rate of displacement of the air by the asphalt, and the properties of the fibers themselves.

Whatever the explanation, the discovery that the more the fibers are processed, the more rapidly they separate has significant commercial potential, for the net result is that those compositions with the highest measurable viscosity, are also the most physically stable. In order to prepare a fibrated asphalt with the highest viscosity per unit weight of cellulosic fiber, the product should therefore be prepared as close to the maximum height of the viscosity-time curve as the design specifications permit.

As will be illustrated below, FMA with several days physical stability can be prepared by choosing the correct conditions. This method of preparation is not only the most cost effective use of the viscosity enhancing properties of the fibers, but also leads to the most physically stable product. As noted above, however, there may be other reasons for modifying the viscosity of the composition by extending the processing time. If this is carried out, however, the physical stability of the FMA will be reduced.

In contrast to previous methods of the manufacture of asphalt cement for road surfaces, the prior blending of the asphalt and the fibers herein described eliminates all the difficulties associated with the blending of asphalt, fibers and aggregate in the field previously described. This method allows the field application to proceed considerably more quickly and accurately than has heretofore been possible, and eliminates the need for expensive blending and monitoring equipment, or the storage of fibers at the application site. The invention and particular aspects and embodiments thereof will be further illustrated by the following examples.

EXAMPLES

Example 1

Improving the Stability of Asphalt Saturated Cellulosic Fibers

In a laboratory simulation of the manufacture of tar paper or roofing shingles, separate fibrous mats were saturated with two grades of asphalt cement: PG 58/-28 and PG 64/-28, the latter containing a proprietary oxidative catalyst. The mat consisted of dried pulp essentially free of chemicals prepared or a paper machine using kraft cellulosic fibers. In the test, samples of this mat approximately 4 cm×8 cm×1 mm in size, were saturated by immersion in molten asphalt at 140–150° C. for 10 minutes. In order to evaluate the effect of incorporating lime, an equal quantity of samples were prepared in this manner using A/C to which either 1 or 2% by weight slaked lime had been added. With one sample of each asphalt coated mat sample retained as a control, the rest were placed in an 165° C. oven in covered, but not air tight, containers. Prom time to time samples were removed and tested. The strength of the samples was evaluated by means of a modified "Cobb" burst strength, in which the weight in kilograms required for a 50 mm ball to penetrate the mat was recorded. In the results shown below the burst strength is expressed in kilograms. For comparison, the burst strength of the retained control samples was 15.0 kg.

| Time aged (hours) | % Lime | PG 58/-28 + Lime | PG 58/-28 No lime | PG 64/-28 + Lime | PG 64/-28 No lime |
|---|---|---|---|---|---|
| 12 | 2% | 13.3 ± 1.1 | 14.3 ± 1.1 | 13.7 ± 1.6 | 13.6 ± 0.4 |
| 55 | 2% | 4.7 ± 0.8 | 3.2 ± 0.3 | 5.0 ± 0.3 | 3.1 ± 0.6 |
| 260 | 1% | 3.4 ± 0.2 | 2.9 ± 0.6 | 4.0 ± 0.9 | 2.1 ± 0.4 |

The results given in the table illustrate that addition of lime at the level of 1 to 2% to the asphalt significantly reduces the rate of thermal degradation of the A/C treated cellulose mat. After aging the samples at 165° C. for 55 hours it was found that those prepared using untreated A/C were considerably weaker than when the paper was saturated with A/C containing 2% lime. Thus in the case of PG 58/-28 with 2% lime, the burst strength was 4.7 kg, or 47% stronger than the 3.2 kg value obtained without lime. In the case of PC 64/-28 with 2% lime the burst strength was 61% higher; 5.0 kg compared to 3.1 kg. After 260 hours at 165° C., the samples saturated with untreated PG 58/-28 had lost 81% of their strength, and in the case of the more acidic PG 64/-28, the reduction was 86% (original burst strength of 15.0 kg reduced to 2.1 kg). The loss of strength was lower for those samples saturated with A/C containing 1% lime. The value of 3.4 kg obtained with the 58/-28 samples containing lime was 17% higher than that without lime, while in the case of the more aggressive 64/-28 the treated samples were 90% stronger (4.0 kg compared to 2.1 kg burst strength).

Example 2

Stabilization of FMA Prepared from 64/-28 Asphalt

FMA was prepared from PG 64/-28 containing 5% Inter-fibe 230 by addition of the fiber to the asphalt with the homogenizer running at low speed. After 10 minutes, the homogenizer speed was increased and samples removed after various time intervals. Viscosity was determined using a Brookfield viscometer at 165° C., 100 RPM, Spindle #6. After mixing was complete, the material was divided into 100 gm samples, to which were added the alkalis, with a non-alkaline control being retained in each case. The organic alkali was triethanolamine, the inorganic alkali was slaked lime. The samples were then stored at 165° C. for 72 hours, after which the viscosity was determined, and the fibers extracted by dissolving the sample in trichloro ethylene, and the fibers washed with kerosene until asphalt free. They were then ranked according to color and volume. Fiber color is presented as an internal reference ranked from 1 (lightest) to 30 (darkest). The fiber volume, expressed as a percentage of the sample volume, gives an indication of the extent to which the fibers have been destroyed (low volume indicates conversion of the fibers into dust).

|  |  | Not Heated Viscosity No Heat | 72 hours Viscosity Not No additives | Fiber % 2305 | Fiber Color heated | Fiber vol. % 4.2  2 68 |
|---|---|---|---|---|---|---|
| Heated | No additives | 2305 | 660 | 2.4 | 25 | 10 |
| " | 9% CTO | 1900 | 420 | 3.5 | 17 | 20 |
| " | 9% CTO + TEA | 1670 | 2955 | 5.7 | 19 | 57 |
| " | 3% TEA | 2300 | 2870 | 5.2 | 18 | 74 |
| " | 1% Slaked lime | 3050 | 2570 | 6.1 | 8 | 60 |

Example 3

Stabilization of FMA Prepared from Polymer Modified 70/-34 Asphalt

The results below were obtained using samples of 70/-34 FMA plant production (Ashwarren Millhaven plant) treated with various alkalis and aged 160 hours at 165° C. In this experiment the amount of alkali added was equivalent to either 0.5 or 1.0% dry sodium hydroxide. In one of these examples slightly excess sodium, hydroxide was used to neutralize the CTO

| Additive | Heating | Viscosity Brookfield (Cps) |
|---|---|---|
| None (control) | No heat | 1585 |
| None | 160 hrs | 1320 |
| 0.5% Sodium hydroxide | 160 hrs | 2300 |
| 1.0% Sodium hydroxide | 160 hrs | 2545 |
| 1.4% Slaked lime | 160 hrs | 1945 |
| 2.3% Sodium metasilicate | 160 hrs | 1350 |
| 5% CTO + 1.5% NaOH | 160 hrs | 1490 |
| 5.6% TEA | 160 hrs | 2235 |

Example 4

Stabilization of FMA Prepared from 58/-28 Asphalt

Loss of fiber strength in PC 58/-28 asphalt proceeds much more slowly than in the acidic PG 64/-28. In this experiment samples of FMA containing Interfibe 230 prepared according to the method in Example 2 were aged up to 275 hours at 165° C., with fiber extraction after 147 and 275 hours. The effect of four different alkalis was determined by comparison with a control with no additives.

| Sample identification Additive | Heating | Viscosity Cps | Fiber Color Rank | Fiber Volume % |
|---|---|---|---|---|
| None (control) | No heat | 1765 | 1 | 36 |
| None | 147 hrs | 785 | 24 | 23 |
|  | 275 hrs | 830 | 25 | 17 |
| 0.5% Lime | 147 hrs | 1805 | 10 | 80 |
|  | 275 hrs | 1850 | 21 | 57 |
| 0.5% NaOH | 147 hrs | 1455 | 21 | 34 |
|  | 275 hrs | 1080 | 24 | 34 |
| 1% TEA | 147 hrs | 2900 | 6 | 92 |
|  | 275 hrs | 2550 | 21 | 63 |
| 1% Sodium metasilicate pentahydrate | 147 hrs | 1200 | 22 | 34 |
|  | 275 hrs | 1300 | N/A | N/A |

Example 5

Stabilization of FMA Prepared from 64/-28 Asphalt

In this experiment samples of 64/-28 FMA containing Interfibe 230 prepared according to the method in Example 2 were aged up to 275 hours at 165° C., with fiber extraction after 147–168 and 275 hours. The effect of three different alkalis and neutralized CTO was determined by comparison with control with no additives.

| Sample identification Additive | Heating | Viscosity Cps | Fiber Color Rank | Fiber Volume % |
|---|---|---|---|---|
| None (control) | No heat | 1765 | 2 | 68 |
| None | 150 hrs | 705 | 28 | 11 |
|  | 275 hrs | 755 | 29 | 11 |
| 0.5% Lime | 168 hrs | 955 | 26 | 12 |
|  | 275 hrs | 1085 | 22 | 25 |
| 1% TEA | 168 hrs | 1195 | 16 | 34 |
|  | 275 hrs | 935 | 28 | 23 |
| 1% Sodium metasilicate pentahydrate | 147 hrs | 845 | 27 | 23 |
|  | 275 hrs | 1115 | N/A | N/A |
| 5% CTO + NaOH | 147 hrs | 965 | 14 | 34 |
|  | 275 hrs | 1340 | N/A | N/A |

Example 6

Viscosity of FMA Using Two Types of Fiber Dispersed in Asphalt

FMA was prepared from a common performance grade asphalt PG 58/-28 supplied by PetroCanada and bleached mechanical pulp from Newstech, Vancouver, according to the method of Example 2. A second experiment was carried out under the same conditions using kraft pulp supplied by Domtar, Espanola. The results illustrate that with both types of pulp the viscosity first increases then decreases, although the rate and magnitude of the viscosity changes are different.

| Shear time (mins) | BCTMP Viscosity, Cps | Kraft HW Viscosity, Cps |
|---|---|---|
| 0 | 200 | 200 |
| 10 | 1885 | — |
| 15 | — | 1570 |
| 25 | 1250 | — |
| 30 | — | 4650 |
| 40 | 1220 | 4650 |
| 45 | 685 | — |
| 50 | — | 2585 |
| 55 | — | 585 |
|  | 0050 | 2585 |

Example 7

Effect of Process Conditions on the Viscosity of FMA Prepared from PG 64/-28 Asphalt and Fibers from Recycled Magazines This experiment used a PetroCanada Performance Grade asphalt PG 64/-28 and commercially available recycled magazine fibers, Interfibe 230.(Interfibe Corp, Cincinnati, Ohio) with and without the addition of crude tall oil. In the first experiment 34 gm Interfibe 230 was added to 570 gm PG 64/-28 (5.7% by weight) under similar conditions as described in Example 2. Similar addition rates and sampling, and viscosity testing was carried out as before. In the second experiment 33 gms Interfibe (5.5% fiber) and 54 gms of crude tall oil (7.6% by weight) were used.

| Shear time (mins) | Interfibe 230 Viscosity, Cps | Interfibe plus CTO Viscosity, Cps |
|---|---|---|
| 0 | 220 | 125 |
| 20 | — | 4000 |
| 30 | 3650 | 2850 |
| 40 | 980 | 1470 |
| 50 | 450 | 365 |

The results illustrate that incorporation of the common additive crude tall oil to the mixture resulted in a similar increase and decrease in viscosity of the dispersion.

Example 8

Effect of Process Conditions on Viscosity of FMA Using a PG 70/-34 Asphalt Containing Rubbery Polymers, and Fibers from Recycled Magazines This experiment exemplifies the use of a high viscosity polymer modified asphalt 70/-34. To 570 PG 70/-34, there was added recycled 26 gm Interfibe 230. The addition sampling conditions were similar to those employed in the previous examples. Brookfield viscosity at 165° C. was determined at 2 RPM.

| Shear time (mins) | Viscosity, Cps |
|---|---|
| 0 | 200 |
| 2 | 12420 |
| 5 | 21730 |
| 8 | 15450 |
| 11 | 16200 |
| 18 | 7340 |
| 21 | 4080 |
| 24 | 3000 |

Example 9

Physical Stability on Storage as a Function of Processing Time

In this experiment two types of Performance Grade asphalt was used: PG 58/-28 and PG 84/-28. In addition to difference in rheological properties at high end use temperatures revealed in the designation (58 and 64° C., respectively), these products differ chemically in that, PG 64/-28 contains some proprietary acidic catalysts. Various types of fiber were added to the two types of asphalt under conditions similar to Example 1 (30 gm fiber added to 570 gm asphalt); samples were removed after different shear times and placed in closed container, and stored 165° C. As previously noted, it was observed that there are two phases to the separation process: at first the fibers rose to the surface, probably due to entrapped air, then they began to sink. The rate of settling was determined by measuring the depth of clear asphalt which formed on the surface as the fibers sink. Sinking is defined as the time taken for asphalt to completely cover liquid surface. This example illustrates that although different fibers settle at different rates, due to their different properties (freeness, density etc.), within a class, the rate of settling is related to the viscosity of the processed composition.

| Sample description | Viscosity, Cps | Time to sink |
|---|---|---|
| 58/−28 Kraft HW | 585 | <<72 hours |
| 58/−28 BCTMP | 685 | <<72 hours |
| 58/−28 Interfibe 230 12/22 IV | 900 | 5 < x < <21 hours |
| 58/−28 Interfibe 230 12/22-II | 2200 | >45 hours |
| 58/−28 Interfibe 230 12/22 III | 2285 | >45 hours |
| 58/−28 Recycled Office Paper | 3435 | >240 hours |
| 12/21 58/−28 N'Tech BCTMP −1 | >4000 | >70 hours |
| 12/21 - II | 2785 | 29 < x < 46 hours |
| 12/21 - V | 2060 | 29 < x < 46 |
| 12/21 - VI | 1245 | 29 < x < <46 |
| 12/21 - VII | 2225 | 29 < x < 46 |

What is claimed is:

1. A fiber-modified asphalt composition comprising asphalt, from 1–10% by weight of cellulosic fibers and sufficient alkaline material to impart enhanced resistance of said fibers to chemical degradation by the asphalt at temperatures at least as great as 160° C.

2. A composition according to claim 1, wherein said cellulosic fibers have a length from 0.1 to 10 mm and a thickness of between 0.01 and 0.1 mm.

3. A composition according to claim 2, wherein said alkaline material is selected from the group consisting of hydroxide, carbonates, silicates and basic salts of Group I, II and III metals; and suitable organic bases which are thermodynamically stable under the conditions of use of said composition.

4. A composition according to claim 2, wherein said alkaline material is selected from the group consisting of hydroxides, carbonates, bicarbonates and soluble silicates of sodium, calcium and magnesium.

5. A composition according to claim 3, wherein said alkaline material is an organic base selected from the group consisting of alkylamines, aryl amines and alkanolamines.

6. A method of preparing an asphalt treated cellulosic fiber mat with improved stability on exposure to heat and sunlight, comprising saturating the mat with a liquid asphalt cement including sufficient alkali to inhibit degradation of the fibers of said mat in the presence of the asphalt.

7. A method according to claim 6, wherein said alkali is slaked lime which has been added to said asphalt cement to a level of 1 to 2% by weight.

8. A method according to claim 6, wherein said asphalt treated cellulosic fiber mat is tar paper.

9. A method according to claim 6, wherein said asphalt treated cellulosic fiber mat is a wood shingle.

* * * * *